(12) United States Patent
Lautman et al.

(10) Patent No.: US 11,187,526 B2
(45) Date of Patent: Nov. 30, 2021

(54) SYSTEM AND METHOD OF MEASURING WARPAGE OF A WORKPIECE ON A NONCONTACT SUPPORT PLATFORM

(71) Applicant: Core Flow Ltd., Daliyat el-Karmel (IL)

(72) Inventors: Ronen Lautman, Haifa (IL); Boaz Nishri, Kibbutz Ma'agan Michael (IL)

(73) Assignee: Core Flow Ltd., Daliyat el-Karmel (IL)

( * ) Notice: Subject to any disclaimer, the term of this patent is extended or adjusted under 35 U.S.C. 154(b) by 2 days.

(21) Appl. No.: 16/801,167

(22) Filed: Feb. 26, 2020

(65) Prior Publication Data

US 2021/0262791 A1    Aug. 26, 2021

(51) Int. Cl.
| | |
|---|---|
| *G01B 13/24* | (2006.01) |
| *F16C 29/02* | (2006.01) |
| *B65G 51/03* | (2006.01) |
| *B65G 43/00* | (2006.01) |
| *B65G 49/06* | (2006.01) |

(52) U.S. Cl.
CPC ............ *G01B 13/24* (2013.01); *B65G 43/00* (2013.01); *B65G 51/03* (2013.01); *F16C 29/025* (2013.01); *B65G 49/065* (2013.01); *B65G 2201/022* (2013.01)

(58) Field of Classification Search
None
See application file for complete search history.

(56) References Cited

U.S. PATENT DOCUMENTS

| | | | | |
|---|---|---|---|---|
| 3,637,362 | A * | 1/1972 | Oelke | C03B 29/10 65/25.2 |
| 5,839,722 | A * | 11/1998 | Berlin | B65H 5/228 269/57 |
| 6,788,991 | B2 * | 9/2004 | De Haas | H01L 21/67259 269/20 |
| 7,604,439 | B2 * | 10/2009 | Yassour | B24B 37/30 406/86 |
| 8,690,489 | B2 * | 4/2014 | Richman | B65G 51/03 406/197 |
| 2015/0085300 | A1 | 3/2015 | Takahashi | |
| 2019/0193200 | A1 * | 6/2019 | Fuji | H01L 21/6776 |
| 2020/0198339 | A1 * | 6/2020 | Alamdar | B41J 11/0085 |

OTHER PUBLICATIONS

International Search Report for PCT Application No. PCT/IL2021/050111 dated Apr. 27, 2021.

* cited by examiner

*Primary Examiner* — William R Harp
(74) *Attorney, Agent, or Firm* — Pearl Cohen Zedek Latzer Baratz LLP (57) ABSTRACT

Methods and systems for determination of warpage in a workpiece supported by a non-contact support platform, including a surface with a plurality of pressure ports and a plurality of fluid evacuation ports on the surface, a supply system with a pressure supply connected to the plurality of pressure ports on the surface and configured to supply pressure at a substantially constant level and cause a fluid to flow out of the plurality of pressure ports, so as to support a workpiece by fluid-bearing formed under the workpiece, and at least one flowmeter, coupled to a controller and configured to measure the flowrate at the surface, wherein the workpiece is determined to be warped when the measured flowrate is outside a predefined flowrate range.

5 Claims, 6 Drawing Sheets

Supporting, by the non-contact support platform, the workpiece with a flow of a fluid through a plurality of ports by fluid-bearing formed under the workpiece
— 301

Measuring at least one of: flowrate by at least one flowmeter, and pressure by at least one manometer
— 302

Determining that the workpiece is warped when the measured flowrate or pressure is outside a predefined range
— 303

FIG. 3

SYSTEM AND METHOD OF MEASURING WARPAGE OF A WORKPIECE ON A NONCONTACT SUPPORT PLATFORM

FIELD OF THE INVENTION

The present invention relates to noncontact support platforms. More particularly, the present invention relates to measurements of a workpiece warpage, for a workpiece supported on a noncontact support platform.

BACKGROUND OF THE INVENTION

Noncontact support platforms have been designed to support a thin and/or flat workpiece, e.g., a substrate, at a predefined distance above a top surface of the platform. Hereinafter, examples are provided that relate to a substrate, but this should not be construed to limit the invention, as any generally flat workpiece may be supported by non-contact support platforms and may be subjected to support by such platforms, according to some embodiments of the present invention. Such noncontact support platforms usually use a flow of fluid (e.g., gas and, in particular, air) to support substrates. Noncontact support platforms typically have a sensitive correlation between the flowrate of the fluid and the gap between the platform and the supported substrate (hereinafter, the "gap"). Precise noncontact support platforms are capable of maintaining the substrate at a known and/or at a predetermined or controlled gap so as to enable or facilitate performance of one or more processing, inspection or other precision operations on the workpiece. Such operations may include, for example, surface inspection, cleaning, coating, heating, etching, or other operations (e.g., on a glass sheet in a production line of TV screens).

The aeromechanical forces acting on the substrate are net zero when the substrate is at an equilibrium position (with a corresponding equilibrium gap), and the aeromechanical forces are non-zero when the substrate deviates from the equilibrium position. One reason the substrate may deviate from the equilibrium position is that the substrate may be warped in its neutral state (e.g., due to a defect, distortion, etc.), and, as the aeromechanical forces act on the substrate, internal stresses may develop in the substrate. Internal stresses may balance out aeromechanical forces at a gap different than the equilibrium gap.

A noncontact support surface may generally include an arrangement of pressure nozzles (or ports) and vacuum nozzles (or ports) on a rigid surface (or platform) of a pressure-vacuum (PV) stage. The pressure nozzles may be connected to a pressure source so as to cause an outflow of air from the PV stage through the pressure nozzles. The vacuum nozzles may be connected to a vacuum source such that ambient air is pumped into the PV stage via the vacuum nozzles. The outflow of air through the pressure nozzles and the inflow of air through the vacuum nozzles may generate an air cushion that is capable of supporting an object (e.g., a flat workpiece) at a fixed gap from the stage surface.

When a thin workpiece is supported over the nozzles (or ports) on the rigid surface, the pressure may act as force pushing the workpiece away from the rigid surface, while the vacuum acts as a force pulling the workpiece toward the rigid surface. The outflow and inflow may create a fluidic spring-like effect that acts against any inflicted changes to the gap between the workpiece and the surface of the stage.

The pressure field in the air cushion under the workpiece may be determined by the pressure and vacuum supplies, the height of the air gap, the physical properties of the pressure and vacuum ports, as well as their geometry. Since a significant pressure drop is required to allow flow through the ports, a net force on the workpiece may be zero at a non-zero equilibrium air gap. When the air gap is smaller than the equilibrium gap, the net force acting on the workpiece may be directed away from the rigid surface. When the air gap is larger than the equilibrium gap, the net force may be directed toward the surface.

A change in the height of the air gap may require a change in the flowrate, and thus a change in the pressure drop across each port. Therefore, a constant pressure supply may result in a net force on the workpiece toward equilibrium, which may be described as a bidirectional aeromechanical spring-like stiffness acting on the workpiece.

SUMMARY OF THE INVENTION

There is thus provided, in accordance with some embodiments of the invention, a system for determination of warpage in a workpiece supported by a non-contact support platform, the system including a surface with a plurality of pressure ports and a plurality of fluid evacuation ports on the surface, a supply system, with a pressure supply connected to the plurality of pressure ports on the surface and configured to supply pressure at a substantially constant level and cause a fluid to flow out of the plurality of pressure ports, so as to support a workpiece by fluid-bearing formed under the workpiece, and at least one flowmeter coupled to a controller and configured to measure the flowrate at the surface. In some embodiments, the workpiece may be determined to be warped when the measured flowrate is outside a predefined flowrate range.

In some embodiments, the supply system may include a vacuum source connected to the plurality of evacuation ports to cause flow of the fluid into the plurality of evacuation ports. In some embodiments, at least one of the pressure ports and the evacuation ports may correspond to a flow restrictor.

In some embodiments, at least one manometer may be coupled to the controller and configured to measure pressure at the non-contact support platform. In some embodiments, the at least one flowmeter may be positioned on a line supplying a region of the surface, and wherein the workpiece may be determined to be warped in the area supplied by the line which the flowmeter is measuring.

There is thus provided, in accordance with some embodiments of the invention, a system for determination of warpage in a workpiece supported by a non-contact support platform, the including: a surface with a plurality of pressure ports and a plurality of fluid evacuation ports on the surface, a supply system comprising a pressure supply connected to the plurality of pressure ports on the surface and configured to maintain a substantially constant flowrate and evacuate a fluid into the plurality of evacuation ports, so as to support a workpiece by fluid-bearing formed under the workpiece, and at least one manometer coupled to a controller and configured to measure the pressure at the surface. In some embodiments, the workpiece may be determined to be warped when the measured pressure is outside a predefined pressure level.

In some embodiments, the supply system may include a vacuum source connected to the plurality of evacuation ports to cause the fluid to flow out of the plurality of evacuation ports. In some embodiments, at least one of the pressure ports and the evacuation ports may correspond to a flow restrictor.

In some embodiments, at least one flowmeter may be coupled to the controller and configured to measure flowrate at the surface. In some embodiments, the at least one manometer may be positioned in at least a portion of the non-contact support platform, and wherein the workpiece may be determined to be warped in an area corresponding to the position of the at least one manometer.

There is thus provided, in accordance with some embodiments of the invention, a system for determination of warpage in a workpiece supported by a non-contact support platform, the system including: a surface comprising a plurality of pressure ports and a plurality of fluid evacuation ports on the surface, a supply system having known relationship between pressure and flowrate for a flat supported workpiece, the supply system comprising a pressure supply connected to the plurality of pressure ports on the surface and configured to supply pressure and cause a fluid to flow out of the plurality of pressure ports, so as to support a workpiece by fluid-bearing formed under the workpiece, and at least one flowmeter or at least one manometer coupled to a controller and configured to measure the flowrate or the pressure in the supply system or at the surface. In some embodiments, the workpiece may be determined to be warped when the measured flowrate or pressure is outside a predefined range.

In some embodiments, the at least one manometer may be positioned in at least a portion of the non-contact support platform, and wherein the workpiece is determined to be warped in an area corresponding to the position of the at least one manometer. In some embodiments, the supply system may include a vacuum source connected to the plurality of evacuation ports to cause flow of the fluid into the plurality of evacuation ports. In some embodiments, at least one of the pressure ports and the evacuation ports may correspond to a flow restrictor. In some embodiments, the at least one flowmeter may be positioned on a line supplying a region of the surface, and wherein the workpiece may be determined to be warped in the area supplied by the line which the flowmeter is measuring.

There is thus provided, in accordance with some embodiments of the invention, a method of determining warpage in a workpiece supported by a non-contact support platform, the method including: supporting, by the non-contact support platform, the workpiece with a flow of a fluid through a plurality of ports by fluid-bearing formed under the workpiece, measuring at least one of: flowrate by at least one flowmeter, and pressure by at least one manometer, determining that the workpiece is warped when the measured flowrate or pressure is outside a predefined range.

In some embodiments, the supply system may be configured to apply pressure to cause flow of the fluid into a first subset of the plurality of ports, and wherein the supply system is configured to apply vacuum to cause flow of the fluid into a second subset of the plurality of ports. In some embodiments, the flowrate may be measured by at least one flowmeter, and wherein the workpiece may be determined to have warpage in an area corresponding to the position of the at least one flowmeter.

In some embodiments, the pressure may be measured by the at least one manometer, and wherein the workpiece may be determined to be warped in an area corresponding to the position of the at least one manometer. In some embodiments, the non-contact support platform may have a known relationship between pressure and flowrate for a flat supported workpiece.

BRIEF DESCRIPTION OF THE DRAWINGS

In order for the present invention to be better understood and for its practical applications to be appreciated, the following Figures are provided and referenced hereafter. It should be noted that the Figures are given as examples only and in no way limit the scope of the invention. Like components are denoted by like reference numerals.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, the conjunction "or" as used herein is to be understood as inclusive (any or all of the stated options).

Some embodiments of the invention may include an article such as a computer or processor readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein.

In accordance with some embodiments of the present invention, a noncontact support system may be configured to detect warpage in a workpiece that is supported by the noncontact support system. For example, a workpiece may be expected to be flat within predetermined tolerances such that deviations from these tolerances may be identified as indicating defects, and/or warpage in that workpiece. For example, warpage may be detected by analysis of one or more sensors that are configured to sense the fluid flow (e.g., of air) at various locations at the supported workpiece. Typically, a flow rate within a predetermined range may be defined as indicating that the workpiece does not possess warpage beyond an allowed extent, and deviations in the flow rate from that range may indicate unacceptable warpage.

Figure 1A:
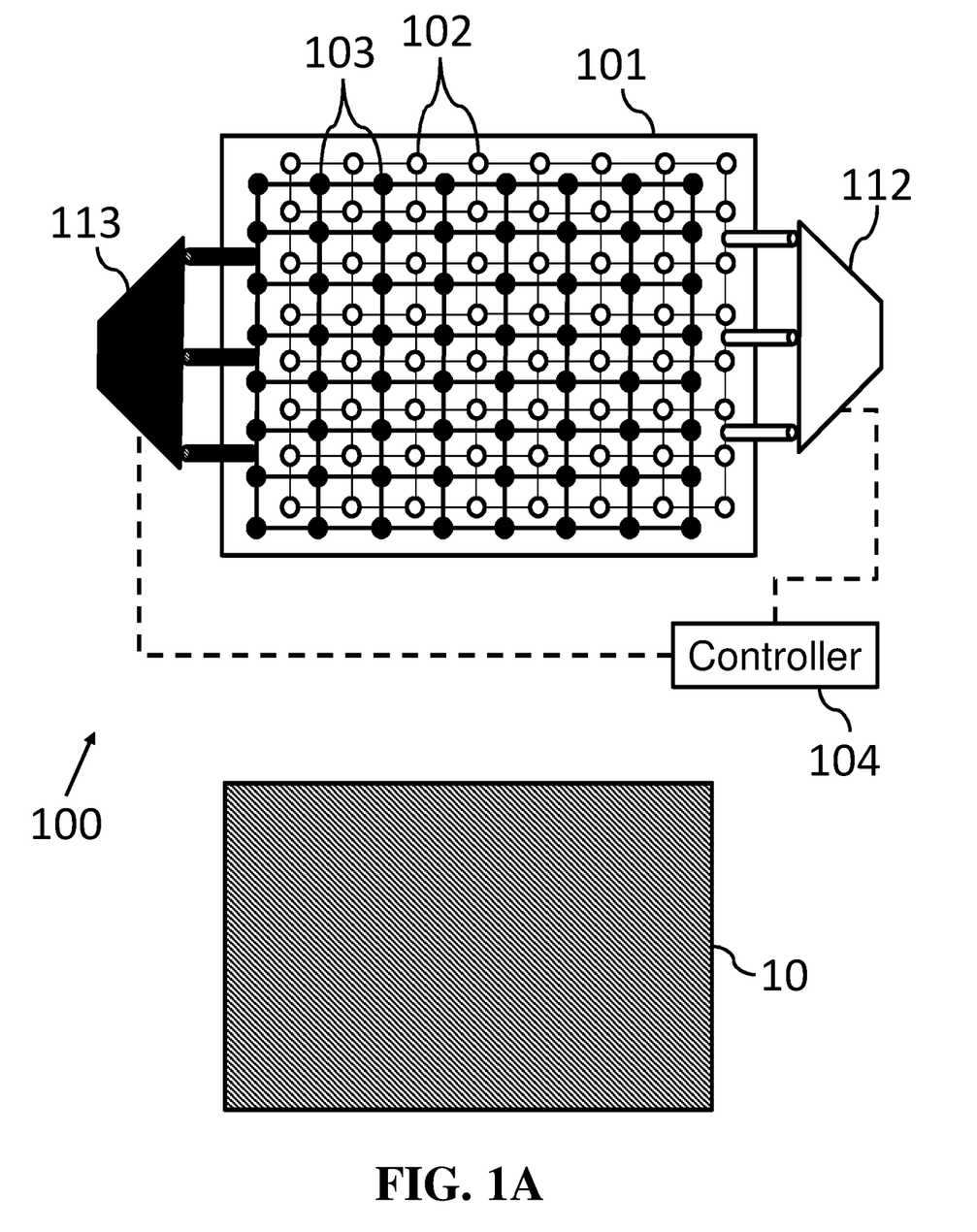
FIG. 1A schematically illustrates a non-contact support platform, according to some embodiments of the invention.

Reference is now made to FIG. 1A, which schematically illustrates a non-contact support platform 100, according to some embodiments. The non-contact support platform 100 may be configured to support a workpiece 10 for processing using a fluidic cushion (e.g., with an air gap).

For example, a workpiece 10 may be a thin pane of glass, e.g., for incorporation into a display screen, where the processing with the non-contact support platform 100 may include application of a substance or tool to the workpiece 10, inspection of the workpiece 10, and/or other processing action. For optimal processing, without damage to the workpiece 10, the non-contact support platform 100 may be used to support the workpiece 10 by contact only with the fluid.

The non-contact support platform 100 may include a surface 101 (e.g., in the form of a horizontal table-top) with a plurality of spaced pressure ports 102 connected to a pressure source 112, such that pressure ports 102 are distributed over surface 101.

Surface 101 may further include a plurality of spaced evacuation (or vacuum) ports 103 connected to a vacuum source 113 (e.g., via a manifold), such that the evacuation ports 103 are distributed over surface 101 (e.g., forming a grid). The surface 101 of the non-contact support platform 100 may include an air-bearing table with ports which are for instance simple holes in the air-bearing table. In some embodiments, at least one pressure port 102 and/or at least one vacuum port 103 may include a nozzle.

When the pressure source 112 and vacuum source 113 are operating, airflow over the surface 101 may form a fluidic cushion. The workpiece 10 may be placed (manually or mechanically) onto the resulting fluidic cushion and accordingly be supported at an equilibrium distance, or height, from the surface 101.

Figure 1B:
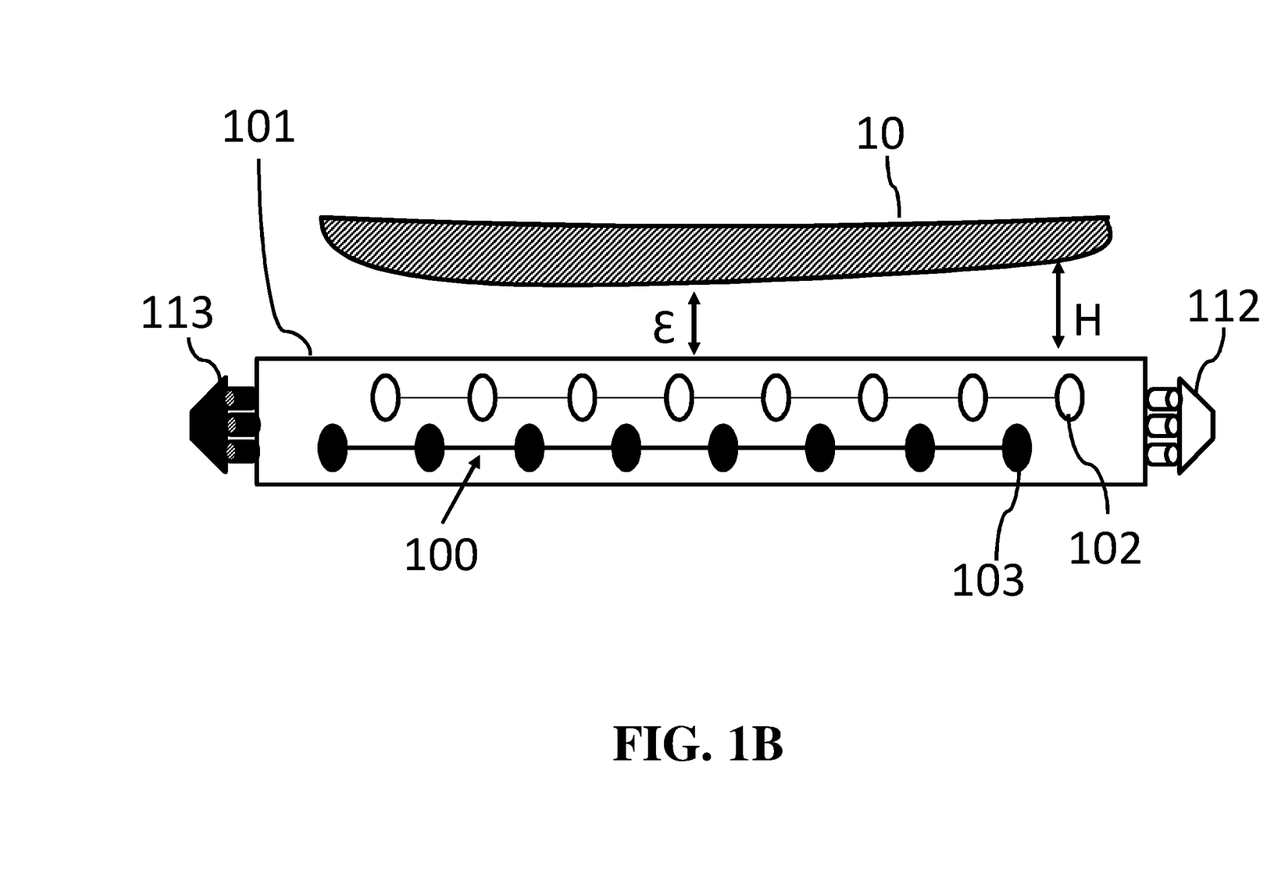
FIG. 1B schematically illustrates a cross-section view of a warped workpiece over the non-contact support platform, according to some embodiments of the invention.

At the equilibrium distance, the pressure forces (via the pressure ports 102) that push the workpiece 10 away from the surface 101 may be balanced by the vacuum forces (via the evacuation ports 103) that tend to pull the workpiece 10 toward the surface 101. The space between the surface 101 and the workpiece 10 that is supported by the fluid cushion is referred to herein as a "gap" (for example as shown in FIG. 1B).

It should be noted that reference herein to air, e.g., in such terms as "airflow", "cushion", "gap", and in other terms, should be understood as referring to any fluid (e.g., gas or other fluids) that flows out of the surface 101 via the pressure ports 102 and into the surface 101 via the evacuation ports 103.

For example, in some cases (e.g., where the noncontact support system is located within a closed environment), another gas (e.g., nitrogen or another gas) may be used instead of air. In some embodiments, Nitrogen gas may be dispensed through the pressure ports that participates in the processing of the workplace, in processes that are sensitive to Oxygen, (e.g., printing oxygen-sensitive ink).

The surface 101 may support the workpiece 10 by airbearing of air flowing through the plurality of ports. For instance, the plurality of pressure ports 102 may be connected to the pressure source 112, and/or the plurality of evacuation ports 103 may be connected to the vacuum source 113 via a respective tubing system, and/or via a manifold, e.g., operated by a pneumatic supply system. The plurality of pressure ports 102 may supply pressure at a substantially constant level (e.g., at a predefined pressure value).

In some embodiments, the supply system with the pressure source 112 and/or the vacuum source 113, connected to the surface 101, may be configured to maintain the air-bearing by applying pressure to cause flow of the fluid out of a subset of the plurality of ports 102, 103. In some embodiments, the supply system may also be configured to apply vacuum to cause flow of air into another subset of the plurality of ports 102, 103.

Reference is now made to FIG. 1B, which schematically illustrates a cross-section view of a warped workpiece 10 over a non-contact support platform 100, according to some embodiments of the invention. For example, the workpiece 10 shown in FIG. 1B may be supported above the non-contact support platform 100, where the gravitational force pulls the workpiece 10 towards the non-contact support platform 100.

The workpiece 10 may be warped such that one or more regions and/or portions of the workpiece 10 are curved or otherwise deviated from flatness. When the workpiece 10 is warped, the aeromechanical forces acting on the workpiece 10, by the non-contact support platform 100, may cause internal stresses to develop in the workpiece 10.

These internal stresses that develop in the workpiece 10 may result in net forces that cause one or more regions and/or portions of the workpiece 10 to remain stable with some gap between that region of the workpiece 10 and the surface 101.

In some embodiments, the extent of flattening of a warped workpiece 10, supported by the non-contact support platform 100, may depend on the neutral warpage of the workpiece 10 (e.g., the warpage of the substrate as it rests on a rigid surface without airflow and with only gravity acting on it), and on the stiffness of the gap.

The gap may be dependent on the gap stiffness and the stiffness of the workpiece 10. Thus, a workpiece 10 with stiffness higher than stiffness of the gap may be supported (or "float") at a gap "H" far from the equilibrium conditions "E", while a workpiece 10 which is less stiff than the gap "H" may be supported at a gap close to the equilibrium gap "E".

In some embodiments, the height of that gap "H" (caused by warpage) may be different from the height of the equilibrium gap "E". It should be noted that, while the warped workpiece 10 shown in FIG. 1B has a warpage with H>E, the height of the gap "H" may be larger or smaller than the height of the equilibrium gap "E".

The workpiece 10 may be at rest (being supported by the non-contact support platform 100) at a gap height "H" such that the internal stresses due to the flattening may balance out the aeromechanical forces. The aeromechanical forces may be of large magnitude when the gap is far from equilibrium conditions, and progressively reduce in magnitude as the gap approaches equilibrium.

The aeromechanical forces may reach net zero when the gap is at equilibrium height. Thus, a slightly warped workpiece 10 may be supported at a gap "H" slightly different from equilibrium gap "E", and a substantially warped workpiece 10 may be supported at a gap "H" substantially different from equilibrium height "E".

According to some embodiments, the fluid flow at the non-contact support platform 100 may be measured to determine regions of the workpiece 10 where the flowrate deviates from the expected flow rate at equilibrium. For example, by measuring the flowrate and/or by measuring the gap between the workpiece 10 and the non-contact support platform 100. Thus, warpage may be detected in one or more regions of the workpiece 10.

According to some embodiments, analysis of measurements that are indicative of a flow rate from a pressure port 102 and/or inflow into an evacuation port 103 may be used to detect warpage of the workpiece 10 at the region of the measurement.

The supply system that generates the flowrate (e.g., with a conduit that connects one or more pressure ports 102 to the pressure source 112) may be coupled to one or more flowmeters. The one or more flowmeters may measure the flowrate in order to analyze the measurement to determine warpage at the workpiece 10.

In some embodiments, analysis of measurements that are indicative of a flow rate from a pressure port 102 and/or inflow out of an evacuation port 103 may be used to detect warpage of the workpiece 10 exceeding a predefined threshold. For example, the predefined threshold may define the ratio of H/E to indicate warpage.

If the gap "H" is different from the equilibrium gap "E", then the flowrate may be different from the equilibrium flowrate, and the static pressure in a given location in the surface 101 may be different from the static pressure at equilibrium conditions.

In some embodiments, if the gap "H" at a particular region of the workpiece 10 differs from the equilibrium gap "E", e.g., as caused by warpage, then the flowrate between the surface 101 and the workpiece 10 at the location of that region may be different from the flowrate where the workpiece 10 is supported at the equilibrium gap "E". Similarly, the static pressure at the surface 101, and/or at any point upstream or downstream of it, at the location of that region may differ from the pressure at a corresponding point where the workpiece 10 is supported at the equilibrium gap "E", as an indication of warpage at the workpiece 10.

For example, a region of the workpiece 10 may be warped "upward" so as to curve away from the surface 101 such that the gap "H" at the location of that region is larger than the equilibrium gap "E" (e.g., as shown in FIG. 1B). The flowrate at that location may then be greater than the flowrate that would be measured when the workpiece 10 is supported at the equilibrium gap "E".

Similarly, the static pressure may be lower than the pressure that would be measured when supported at the equilibrium gap "E". It should be noted that a stronger pressure level may indicate higher pressure and/or stronger vacuum.

Similarly, a region of the workpiece 10 may be warped "downward" so as to curve toward the surface 101 such that the gap "H" at that region is smaller than the equilibrium gap "E". The flowrate at that region may accordingly be lower than the flowrate at equilibrium conditions, and the static pressure may be greater than pressure at equilibrium conditions.

In some embodiments, the flowrate through the gap may be proportional to the gap height "H" raised to the third power, flowrate $\propto$ $H^3$. Accordingly, measurement of the flowrate may be indicative of the gap height "H". If a measurement of the flowrate for at least one region of the workpiece 10 (e.g., with a flowmeter) exceeds a predefined threshold, then it can be concluded that at least one region of the workpiece 10 may be warped beyond a predefined threshold or is outside a predefined flowrate range.

For example, the flowrate for supporting a workpiece 10 without warpage may be measured, to be defined as a threshold flowrate that other measurements exceeding that threshold may be an indication of warpage in the workpiece 10.

Figure 2A:
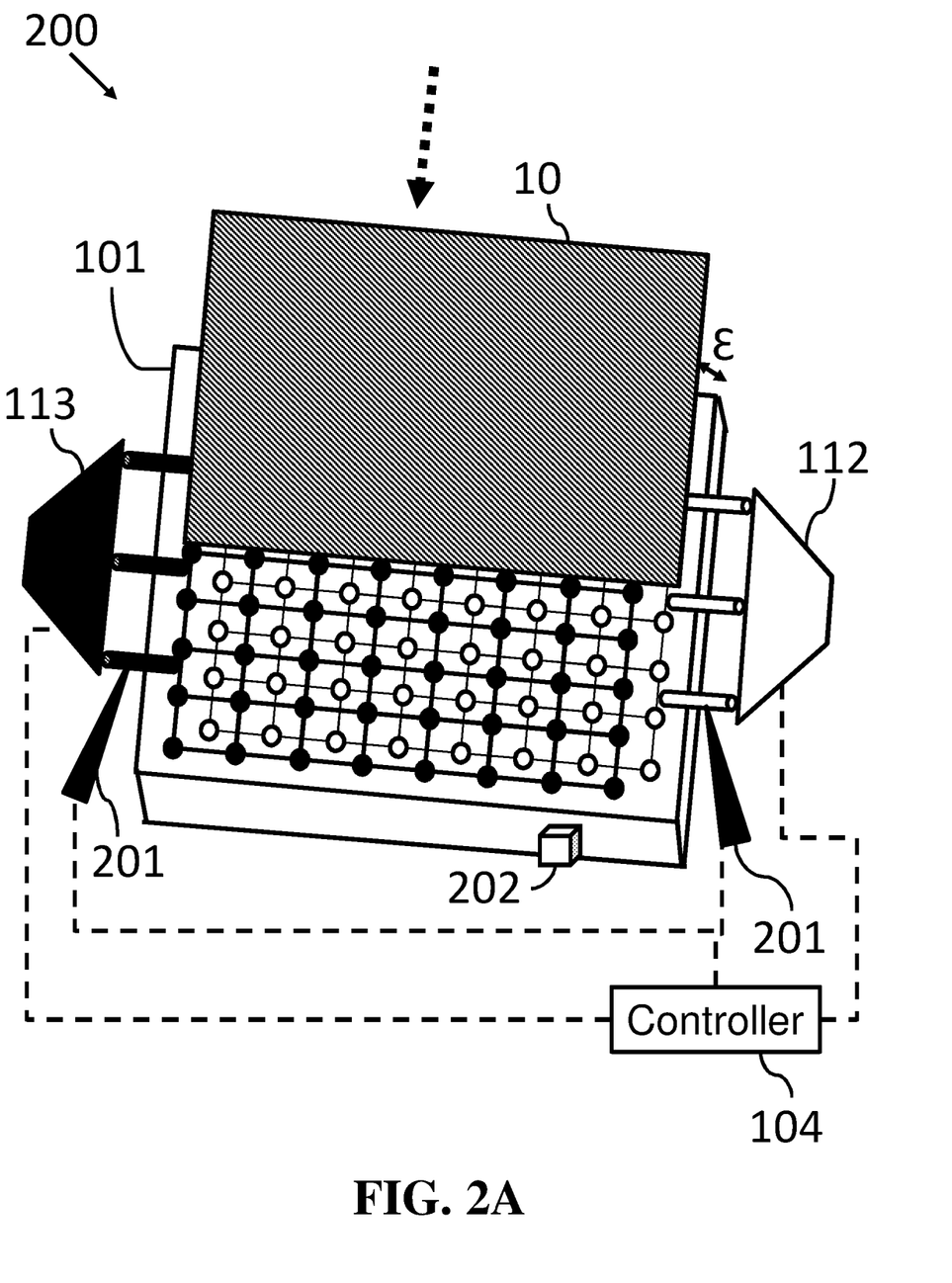
FIG. 2A schematically illustrates a perspective view of a system for determination of warpage in a workpiece, according to some embodiments of the invention.
Figure 2B:
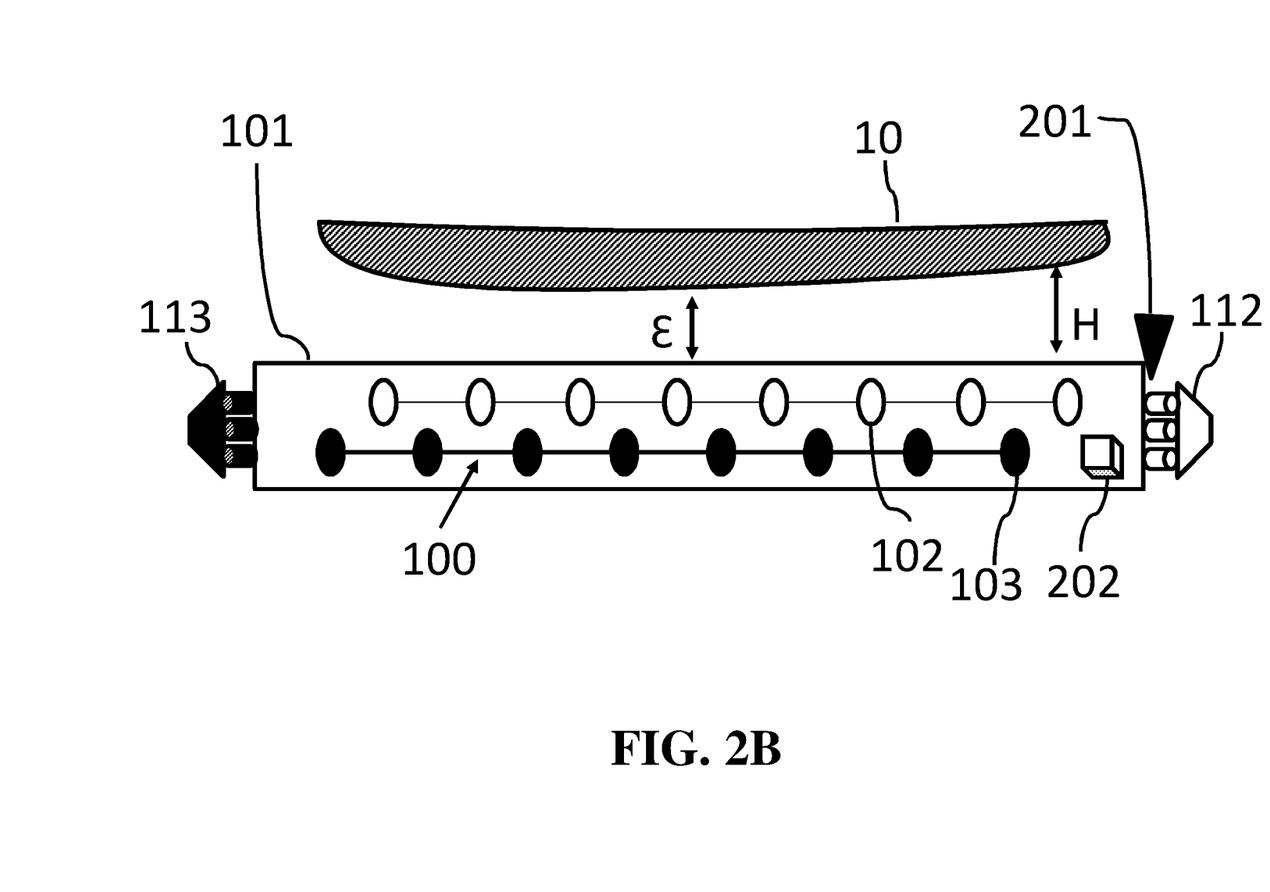
FIG. 2B schematically illustrates a cross-section view of the system shown in FIG. 2A, according to some embodiments of the invention.

Reference is now made to FIGS. 2A and 2B, which schematically illustrate a perspective view and a cross-section view, respectively, of a system 200 for determination of warpage in a workpiece 10, according to some embodiments.

The system 200 may include the non-contact support platform 100 (e.g., as shown in FIGS. 1A-1B) with at least one flowmeter 201 in order to measure the flowrate at the surface 101. In some embodiments, the system 200 may include at least one flowmeter 201 connected to the tubing system, upstream and/or downstream of the non-contact support platform 100. The at least one flowmeter 201 may be controlled by the controller 104. In some embodiments, the at least one flowmeter 201 may be connected to the tubing system between the pressure source 112 (or vacuum source 113) and the surface 101.

In some embodiments, the at least one flowmeter 201 may be coupled to the supply system of the non-contact support platform 100, for instance coupled to the pressure source 112 and/or to the vacuum source 113.

The workpiece 10 may be moved (manually or mechanically) onto the non-contact support platform 100 of the system 200, for instance at the direction of the arrow shown in FIG. 2A, such that the workpiece 10 is supported by the airflow created by the non-contact support platform 100.

The measurement may be performed when the workpiece 10 is at rest, or when the substrate is in motion, for instance at several locations along a strip which is perpendicular to the direction of motion.

In some embodiments, the system 200 may measure the flowrate and/or measure the static pressure at the non-contact support platform 100. If the measured value exceeds a predefined threshold (e.g., is outside an allowed tolerance level) indicating warpage, then the system 200 may alert the operator that the workpiece 10 is warped. For example, the controller 104 may issue an alert upon detection of a flowrate corresponding to the gap height "H" being larger than the equilibrium gap "E".

In some embodiments, measurements of flowrate and/or static pressure by the at least one flowmeter 201 may indicate warpage of the workpiece 10 at that location of the at least one flowmeter 201.

According to some embodiments, if the measurement is to be performed when the workpiece 10 is at rest, certain areas of the surface 101 may be monitored. These areas may be selected to be monitored according to the area's sensitivity.

For example, the corner of the workpiece 10 is expected to be more warped than the center of the workpiece 10. Accordingly, at least four areas may be selected for monitoring, one under each corner of the workpiece 10, with at least one flowmeter 201 for each such region or area.

Figure 2C:
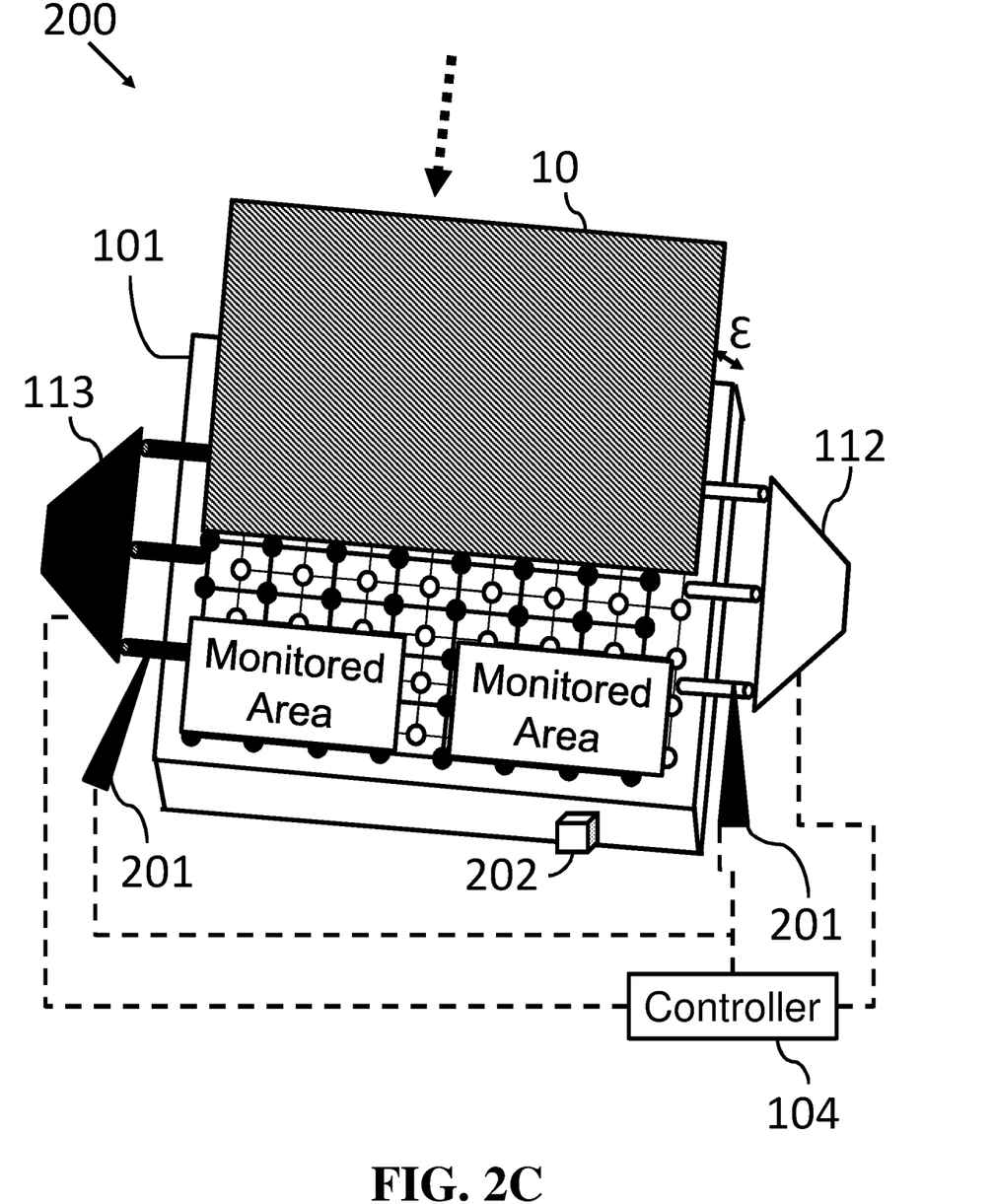
FIG. 2C schematically illustrates a perspective view of monitored areas by the system for determination of warpage in a workpiece, according to some embodiments of the invention.

Reference is now made to FIG. 2C, which schematically illustrates a perspective view of monitored areas by the system 200 for determination of warpage in a workpiece 10, according to some embodiments. A process involving the workpiece 10 may not be time-sensitive, such that the workpiece 10 may be measured for warpage more than once.

Accordingly, at least two areas of the surface 101 may be selected for monitoring, each area under two neighboring corners whose connecting side is perpendicular to the direction of motion. Two corners of the workpiece 10 may be measured, while the workpiece 10 is stationary, then the workpiece 10 may move and stop when the other two corners are over the monitored areas for additional measurement of those corners.

Thus, the system 200 may allow measurements with fewer flowmeters 201, while taking advantage of the motion of the workpiece 10 for measurement of different areas using the same flowmeters 201.

In another example, the system 200 may be used to protect sensitive equipment, such as in a process involving a printing head which must be placed near the top surface of a flat substrate. A substrate which is warped upward may collide with the printing head and cause damage. The system 200 may be accordingly embedded upstream of the printing head and may be used to alert the operator to remove the substrate before the potential collision.

In another example, a coating process may require a certain substrate floating height. A warped substrate being handled by an aeromechanical platform may not conform to this floating height. The system 200 may be accordingly embedded upstream of the coating process and may be used to alert the operator to avoid coating the substrate and thus reduce wasted coating material.

In some embodiments, the monitoring may be carried out by using the at least one flowmeter 201 to measure the fluid flow directly at the surface 101. In some embodiments, the monitoring may also be carried out by using at least one manometer 202 to measure the pressure inside the non-contact support platform 100, since the pressure inside the non-contact support platform 100 may change depending on the flowrate through the non-contact support platform 100.

In some embodiments, the at least one manometer 202 may be configured to measure at least one of full pressure, gauge pressure, and differential pressure.

In some embodiments, at least one flowmeter 201 and/or at least one manometer 202 may be positioned at each portion of the non-contact support platform 100 for monitoring of warpage at the workpiece 10.

In some embodiments, the controller 104 may continuously receive signals from the at least one flowmeter 201 and/or at least one manometer 202 with measurement data, for instance to be analyzed by the controller 104. For example, the received measurements may be compared to predefined thresholds, such that the controller may issue an alert upon detection of a measurements exceeding a predefined threshold.

For example, the system 200 may include one or more restrictors (integrated into the non-contact support platform 100) that require a pressure drop to allow a given flowrate to pass through. A change in the flowrate (e.g., due to a change in the gap height "H") may accordingly cause a change in the pressure drop around the one or more restrictors.

Thus, measuring the pressure drop around the one or more restrictors (e.g., with differential pressure sensors) may give an indication of the flowrate through the non-contact support platform 100. The measurement of the pressure drop may be carried out with a dedicated sensor and/or indicator.

According to some embodiments, the workpiece may be determined to be warped in one of three cases. In the first case, the pressure may be maintained in a substantially constant level and the flowrate may be measured (e.g., by a flowmeter) for changes outside a predefined range to indicate that the workpiece is warped. In the second case, vacuum may be applied to maintain a substantially constant flowrate and evacuate the fluid (e.g., air) into the plurality of evacuation ports and the pressure may be measured (e.g., by a manometer) for changes outside a predefined range to indicate that the workpiece is warped. In the third case, the supply system may have a known relationship between pressure and flowrate for a flat (or not warped) supported workpiece, and the flowrate and pressure may be measured (e.g., by a flowmeter and/or manometer) for changes outside a predefined range to indicate that the workpiece is warped.

In some embodiments, the monitoring may be carried out by measuring absolute pressure on one or both sides of the one or more restrictors, by measuring gauge pressure and/or measuring differential pressure across the one or more restrictors.

According to some embodiments, the gap stiffness may be determined by Computational Fluid Dynamics (CDF), for instance using a numerical analysis software. Many such programs are commercially available, such as ANSYS® by Ansys Inc., FloEFD® by Mentor Graphics, Simulation CFD® by Autodesk, and SC-Tetra® by Cradle, as well as the open-source software OpenFOAM®.

The CFD software may calculate the aeromechanical forces acting on the workpiece by constructing the geometry of the flow-field to be solved and by dividing the flow-field into discrete elements or discrete volumes (depending on the specific software) of appropriate size. The boundary conditions may be defined at each surface and the flow-field may be calculated using the boundary conditions and/or using the Navier-Stokes equations of fluid dynamics or other modeling equations.

In some embodiments, the output at every point in the computational domain may be derived as the static pressure and/or as the flowrate at the non-contact support platform 100. Additionally, the net force on the surface modeling the workpiece 10 may be calculated.

In some embodiments, a CFD analysis may be carried out for each gap height "H". For example, until a warpage is detected. A series of net forces on the workpiece 10 may be found, for instance as a function of the gap height "H" only.

In some embodiments, stiffness of the gap may be derived by calculating the change in the net force from one gap to another, for instance caused by changes in pressure and/or flowrate throughout the non-contact support platform 100.

When a low-stiffness fluidic cushion is established at the non-contact support platform 100 to support a warped workpiece 10, the workpiece 10 may be accordingly at least partly straightened due to the airflow. As a result, the flow through the aeromechanical non-contact support platform 100 may be different from the originally designed flowrate (for a non-warped workpiece). Thus, this flowrate (e.g., measured with a dedicated sensor) may be used as an indication whether the warpage of the workpiece 10 is beyond a predefined threshold.

In some embodiments, the flattening capability of the non-contact support platform 100 may be expressed in the fluidic cushion stiffness and substrate warpage rigidity with three parameters: surface thickness, wavelength of the workpiece warpage and neutral warpage of the workpiece.

In some embodiments, the fluidic cushion stiffness required for detection of warpage may be directly proportional to the absolute value of the warpage. The fluidic cushion stiffness required for detection may be proportional to the wavelength of the warpage raised to the fourth power. The relations between these three parameters with the gap stiffness may be expressed as follows:

(I) fluidic cushion stiffness ∝ workpiece neutral warpage
(II) fluidic cushion stiffness ∝ (workpiece wavelength)$^4$
(III) fluidic cushion stiffness ∝ (workpiece thickness)$^3$ For example, in order to detect warpage in the range of 0.1-10 millimeters, in a workpiece of thickness 0.1-10 millimeters, the required gap stiffness may be in the range of 0.0002-20000 grf/cm$^2$*μm, where "grf" is the gram-force unit.

In another example, in order to detect warpage in the range of 0.1-1 millimeters, in substrates of thickness 0.1-3 millimeters, the required gap stiffness may be in the range of 0.0002-50 grf/cm$^2$*μm.

In another example, in order to detect warpage in the range of 0.1-0.5 millimeters, in substrates of thickness 0.1-0.7 millimeters, the required gap stiffness may be in the range of 0.0002-0.3 grf/cm$^2$*μm.

In another example, in order to detect warpage in the range of 0.1-1 millimeters, in substrates of thickness 0.1-0.5 millimeters, the required gap stiffness may be in the range of 0.0002-0.25 grf/cm$^2$*μm.

In another example, in order to detect warpage in the range of 0.1-1 millimeters, in substrates of thickness 0.1-0.4 millimeters, the required gap stiffness may be in the range of 0.0002-0.15 grf/cm$^2$*μm.

In another example, in order to detect warpage in the range of 0.1-1 millimeters, in substrates of thickness 0.1-0.3 millimeters, the required gap stiffness may be in the range of 0.0002-0.05 grf/cm$^2$*μm.

Figure 3:
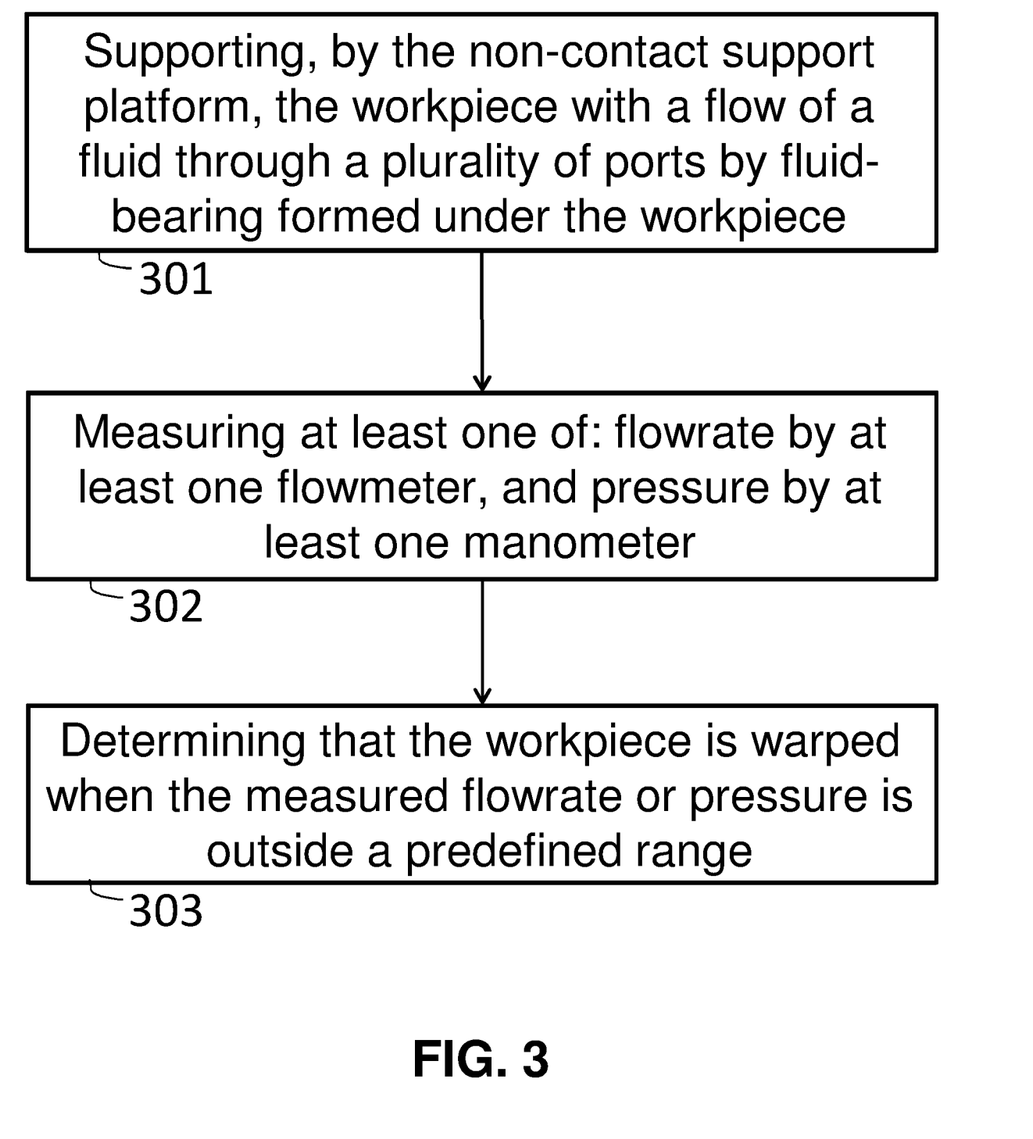
FIG. 3 shows a flowchart of a method of determining warpage in a workpiece, according to some embodiments of the invention.

Reference is now made to FIG. 3, which shows a flowchart for a method of determining warpage in a workpiece supported by a non-contact support platform, according to some embodiments.

In Step 301, the workpiece may be supported by the non-contact support platform with a flow of a fluid through a plurality of ports by fluid-bearing formed under the workpiece, at the surface of the non-contact support platform. For example, the workpiece may be placed onto the non-contact support platform for processing and may be supported with a fluid cushion created by the fluid flow through the ports. For example, the supply system may be configured to apply pressure to cause flow of the fluid into a subset of the plurality of ports and/or the supply system may also be configured to apply vacuum to cause flow of the fluid into another subset of the plurality of ports.

In Step 302, the flowrate to the surface of the non-contact support platform may be measured by at least one flowmeter, for instance on a tubing line supplying fluid to that region of the surface, and/or the pressure may be measured by at least one manometer. In some embodiments, the at least one flowmeter may be positioned upstream and/or downstream of at least one portion of the surface (e.g., in at least one corner of the surface), such that the workpiece may be determined to have warpage in an area corresponding to the area supplied by the tubing line that the at least one flowmeter.

In some embodiments, the pressure may be measured at the non-contact support platform by at least one manometer coupled to the controller such that the workpiece may be determined to have warpage when the measured pressure exceeds a predefined threshold.

In Step 303, the controller may determine that the workpiece is warped when the measured flowrate or pressure is outside a predefined range. For example, the flowrate at equilibrium conditions may be defined as the threshold and measured flowrates with different values may indicate warpage in the workpiece.

Referring back to FIGS. 2A-2B, the system 200 may include a flow circuit formed by the noncontact support platform, including a pressure source, fluid supply channels and/or piping with a vacuum source, and a gap flow resistance (e.g., a flow resistance created between the noncontact support platform surface and the workpiece) to measure the flowrate. The gap flow resistance may be dominant in the flow circuit and may be sensitive to the gap height (ϵ or H), such that by measurement of the gap height may correspond to the gap flow resistance.

In some embodiments, when a non-warped workpiece is placed on the noncontact support platform, the equilibrium of the aerodynamic forces may cause the workpiece to float at a substantially uniform height ϵ, and the resistance of the flow circuit may accordingly be the resistance of the gap height ϵ. However, when a warped workpiece is placed on the noncontact support platform, the equilibrium of the aerodynamic forces with the response of the internal stress developing in the warped workpiece due to the aerodynamic forces, may cause the workpiece to float at a non-uniform height ("H"), and the resistance of the flow circuit may then be different than the one of the gap height ϵ. Thus, characteristics of such a supply system may depend on flow resistance.

For example, if the vacuum and/or the pressure remain constant, the flow rate may depend on (gap height)$^3$. The flow rate through the system may be an indication of the of the workpiece warpage since the gap of a warped workpiece may be different from that of the non-wrapped workpiece. It should be noted that such supply systems are typically characterized by a curve describing the ratio between flow rate to pressure (or vacuum) supply, and thus the indication of workpiece warpage may be characterized by a different point on the flow rate-pressure (or flow rate-vacuum) characteristic curves.

While certain features of the invention have been illustrated and described herein, many modifications, substitutions, changes, and equivalents may occur to those skilled in the art. It is, therefore, to be understood that the appended claims are intended to cover all such modifications and changes as fall within the invention.

Various embodiments have been presented. Each of these embodiments may of course include features from other embodiments presented, and embodiments not specifically described may include various features described herein

The invention claimed is:

1. A method of determining warpage in a workpiece supported by a non-contact support platform, the method comprising:

supporting, by the non-contact support platform, the workpiece with a flow of a fluid through a plurality of ports by fluid-bearing formed under the workpiece;

measuring at least one of: flowrate by at least one flowmeter, and pressure by at least one manometer; and determining that the workpiece is warped when the measured flowrate or pressure is outside a predefined range.

2. The method of claim 1, wherein the supply system is configured to apply pressure to cause flow of the fluid into a first subset of the plurality of ports, and wherein the supply system is configured to apply vacuum to cause flow of the fluid into a second subset of the plurality of ports.

3. The method of claim 1, wherein the flowrate is measured by at least one flowmeter, and wherein the workpiece is determined to have warpage in an area corresponding to the position of the at least one flowmeter.

4. The method of claim 1, wherein the pressure is measured by the at least one manometer, and wherein the workpiece is determined to be warped in an area corresponding to the position of the at least one manometer.

5. The method of claim 1, wherein the non-contact support platform has a known relationship between pressure and flowrate for a flat supported workpiece.

\* \* \* \* \*